United States Patent [19]

Boudreau et al.

[11] Patent Number: 4,600,992
[45] Date of Patent: Jul. 15, 1986

[54] PRIORITY RESOLVER WITH LOWEST PRIORITY LEVEL HAVING SHORTEST LOGIC PATH

[75] Inventors: Daniel A. Boudreau; Edward R. Salas, both of Billerica, Mass.

[73] Assignee: Honeywell Information Systems Inc., Waltham, Mass.

[21] Appl. No.: 449,703

[22] Filed: Dec. 14, 1982

[51] Int. Cl.⁴ .......................... G06F 9/46; G06F 15/16
[52] U.S. Cl. ..................................................... 364/200
[58] Field of Search ................................ 364/200, 900

[56] References Cited

U.S. PATENT DOCUMENTS

| 4,065,809 | 12/1977 | Matsumoto | 364/200 |
| 4,128,881 | 12/1978 | Yamamoto et al. | 364/200 |
| 4,334,288 | 8/1982 | Booher | 364/900 |
| 4,415,972 | 11/1983 | Adcock | 364/200 |

Primary Examiner—Gareth D. Shaw
Assistant Examiner—Daniel K. Dorsey

Attorney, Agent, or Firm—William A. Linnell; George Grayson; John S. Solakian

[57] ABSTRACT

A data processing system including a dual ported main memory that can be accessed by I/O controllers via a common bus or directly by the central processing unit. The main memory is comprised of a volatile RAM array that requires periodic refreshing to prevent loss of information. Access to the main memory is controlled by a priority resolver that awards access to the main memory on the basis of predetermined priority levels assigned to CPU, I/O and refresh requests. The priority resolver produces an early signal that is usable to initiate a memory cycle before the final winner of the main memory is determined. The logic path of the lowest priority requester is the shortest path thus allowing the lowest priority requester to initiate a memory cycle in the shortest amount of time even though another requester may ultimately win use of the memory. The priority resolver also provides for the early resetting of access requests so that subsequent requests can be made with minimum delay.

15 Claims, 3 Drawing Figures

PRIORITY RESOLVER WITH LOWEST PRIORITY LEVEL HAVING SHORTEST LOGIC PATH

RELATED APPLICATIONS

The following patent applications, which are assigned to the same assignee as the instant application, have related subject matter and are incorporated herein by reference.

| TITLE | INVENTORS | SERIAL NUMBER |
| --- | --- | --- |
| Priority Resolver Having Dynamically Adjustable Priority Levels | Daniel A. Boudreau and Edward R. Salas | 449,702 Dated December 14, 1982 |

Distributed Priority Network Logic For Allowing A Low Priority Unit To Reside In A High Priority Position; Daniel A. Boudreau, Edward R. Salas, James M. Sandini, and George J. Barlow, Ser. No. 453,406; Filed Dec. 27, 1982.

BACKGROUND OF THE INVENTION

1. Field of the Invention

This invention relates to data processing systems and more specifically to a method and apparatus for resolving the allocation of a shared resource on a priority basis such that the requester having the lowest priority has the shortest path through the priority resolving logic.

2. Description of a Data Processing System

Figure 1:
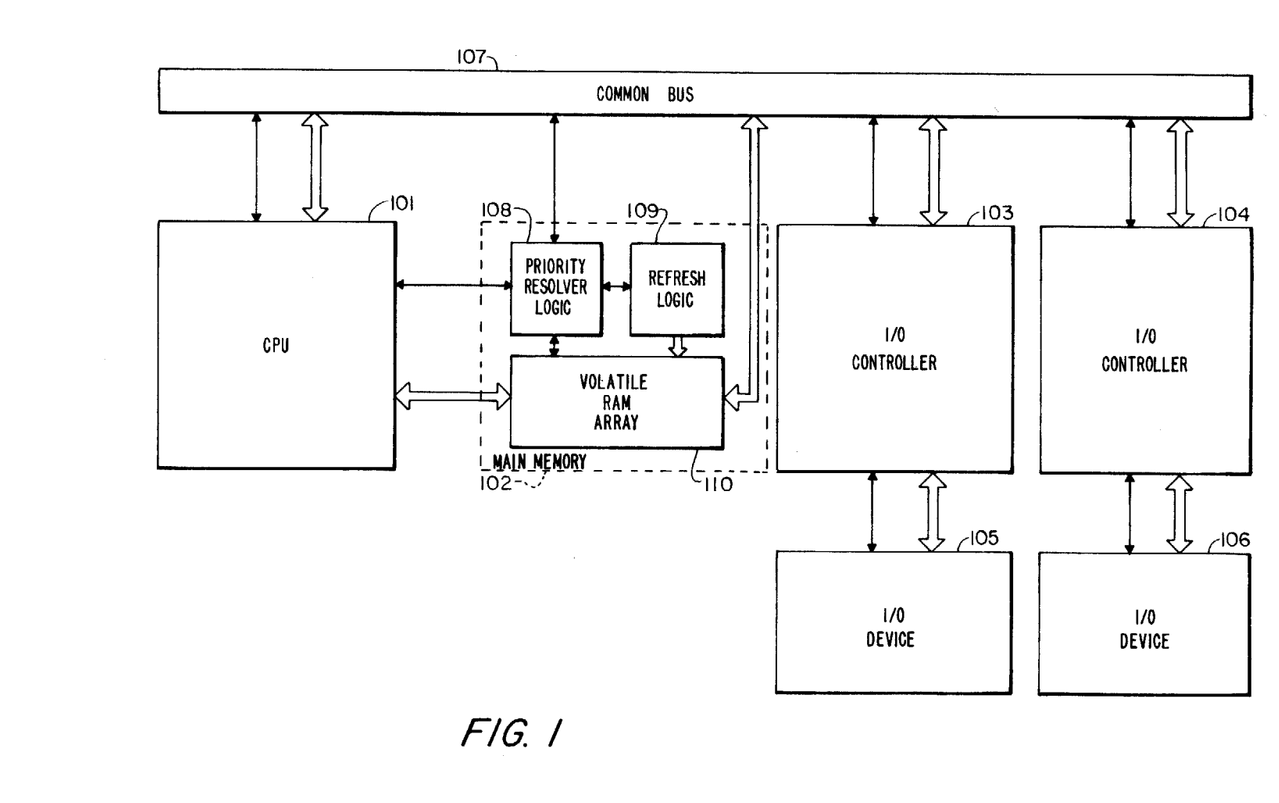
FIG. 1 is a general block diagram of a data processing system using a priority resolver.

FIG. 1 shows a data processing system of the preferred embodiment which is comprised of a CPU 101, a main memory 102, a first I/O controller 103 with an attached I/O device 105 and a second I/O controller 104 with an attached I/O device 106, and common bus 107. In FIG. 1, the thinner lines connecting the various components are control lines and the thicker lines connecting the components are data/address lines. In this system, both program instructions and data are stored in main memory 102.

Main memory 102 is a dual ported memory such that one port connects to the common bus 107 so that memory requests and data transfers may be made by either I/O controller 103 or I/O controller 104 via common bus 107 whereas requests for memory from CPU 101 normally take place directly between CPU 101 and main memory 102 without going via common bus 107.

Because main memory 102 maintains information in volatile RAM array 110, such as MOS semiconductor memory chips, it requires periodic refresh in order not to lose its information content. Main memory 102 contains refresh logic 109 which periodically makes a request for the memory for the purpose of refreshing the volatile RAM array 110.

Priority resolver logic 108 is provided within the main memory 102 to resolve the possible conflicts between competing requests for access to RAM array 110. These competing requests can come from an I/O controller wanting access to the main memory to read or write information from it or into it or from the CPU requesting to read or write into RAM array 110 or from refresh logic 109 requesting access to the RAM array in order to refresh the information contained therein. Priority resolver 108 is in addition to any priority scheme which is used to resolve competing requests for use of the common bus.

In a system in which the refresh logic 109, I/O controller 103 or 104 and CPU 101 may be making competing requests, it is well known in the art to assign priorities to the competing requests such that the highest priority requester will be granted the shared resource over any lower priority requesters then making a request. One scheme is to assign the highest priority to the refresh logic, the medium priority to a request from the common bus which in this case would be from another one of the I/O controllers 103 or 104 and the lowest priority of the CPU 101.

This assignment of priority levels has the advantage that the refresh logic normally must receive access at well defined periodic intervals in order to refresh volatile RAM array 110 and the postponement of the refreshing can result in loss of memory information. Middle priority is assigned to requests originating from the common bus, which in this case is from the I/O controllers, because I/O controllers are usually in less of a position to be postponed too long when requesting access to the main memory. For instance, when writing to a disk, if the data is not immediately available to the disk and arrives too late to the controller, the disk will have rotated further than the desired position to write the data and this will result in a data underrun error. When reading from a disk, if the data is not taken from the I/O controller, the second word of data may arrive before the first word is taken and result in a data overrun error. Because the time constraints in reading and writing to an I/O device are usually such that a refresh operation can be performed between successive words of data, the refresh operation is given higher priority over that of access from the common bus. Memory requests from the CPU are given the lowest priority because the CPU is usually designed such that access to operand data and program instructions within the main memory is not critical to the extent that the CPU can wait until the memory becomes available without losing data. The only consequence of having to wait being that the program executes more slowly each time the CPU has to wait for the memory to become available to it. Thus, access priority is assigned in the order of real time contraints with the device having the least demanding time constraint being given the lowest priority.

Although various schemes for resolving competing requests on a priority basis are well known in the art, most of these schemes work such that the shared resources are granted to the highest priority device in the shortest amount of time, that is, the priority resolver has the shortest logical path used by the highest priority request. Alternatively, the logic paths for all requests are of equal length such that the resolution of the competing requests takes equal time, independent of the priority level of the requester. However, because the central processing unit in most data processing systems makes the most requests of main memory and it is often assigned the lowest priority with respect to access of the main memory, it would be desirable in order to speed up program execution wherever possible to have the lowest priority requester have the shortest logical path through the resolver logic.

Therefore, what is desired is to have a priority resolver logic with the shortest logical path being used by the lowest priority requesting device. It is also desirable in a priority resolver, particularly when resolving competing requests for access to main memory, to be able to initiate a cycle as early as possible even before the final resolution as to which one of the competing requests will be granted access to the shared resource.

OBJECTS OF THE INVENTION

Accordingly, it is the primary object of this invention to provide an improved priority resolver wherein the lowest priority requester has the shortest logical path to initiate use of a shared resource.

It is another object of the present invention to provide a new and improved system for resolving priorities between competing requests wherein the priority resolver will produce a signal indicating that there are one or more outstanding requests even before making the final resolution of the priority among the competing requests.

It is a further object of the present invention to provide an improved technique and apparatus for resolving priorities among competing requests for a shared resource that is both fast in time and low in cost.

This invention is pointed out with particularity in the appended claims. An understanding of the above and further objects and advantages of this invention can be obtained by referring to the following description taken in conjunction with the drawings.

SUMMARY OF THE INVENTION

The foregoing objects are achieved according to one embodiment of the invention according to one mode of operation thereof, by providing in a data processing system, a priority resolver for allocating a shared resource. The priority resolver is comprised of an ask flip-flop for each priority level that is set by a signal requesting use of the shared resource. These individual ask flip-flops can be set at any time within a priority resolution cycle and remain set until the associated priority level has won use of the shared resource. By resetting the ask flip-flop of the winning priority level relatively early within a priority resolution cycle, a subsequent request for the shared resource can be made and the same priority level can compete in the next priority resolution cycle.

The output of individual ask flip-flops is connected to the inputs of corresponding grant flip-flops. These individual grant flip-flops are set at the beginning of each priority resolution cycle if their corresponding ask flip-flop is set at the beginning of the priority resolution cycle. In a priority resolution cycle, as many grant flip-flops will set as there are ask flip-flops set at the beginning of a priority resolution cycle. All grant flip-flops are reset at the end of each priority resolution cycle by a common ask reset signal. When this reset signal returns to its non-reset state, the next priority resolution cycle can begin.

The output of all grant flip-flops is ORed together to provide an early shared resource initiate signal that indicates that at least one priority level has requested use of the shared source even though the final winner has not yet been determined. The output of each grant flip-flops is also used to partially enable a first gate associated with the priority level that has as additional inputs the inverted outputs of all higher priority grant flip-flops. The individual outputs of these first gates indicate that associated priority level might win use of the shared resource.

The initiate signal is delayed a sufficient time to allow all grant flip-flops that are going to be set during the priority resolution cycle time to set. This delayed initiate signal is used as one input to individual second gates associated with each priority level that have as their other input the output of their corresponding first gates. During any given priority resolution cycle, only one of these second gates is fully enabled and its output indicates that the associated priority level has won access to the shared resource.

The output of the individual second gates is fed back to reset its corresponding ask flip-flop so that once the real winner has been determined, its corresponding ask flip-flop will be reset while those ask flip-flops of the non-winning priority levels remain unchanged.

Placed between each ask flip-flop and its corresponding grant flip-flop, of all but those of the lowest priority level, is a set gate which is partially enabled by the output of its ask flip-flop, if the ask flip-flop has been set by a request. Each set gate further receives a common request cut-off signal. This cut-off signal, which is initially in an enable state at the beginning of priority resolution cycle, is derived from delaying the initiate signal a sufficient time to allow all grant flip-flops to set that have their corresponding ask flip-flops set at the beginning of a priority resolution cycle. Each set gate also receives as inputs the inverted output of all lower priority grant flip-flops such that the setting of any lower priority grant flip-flop will prevent any late arriving request from setting its corresponding grant flip-flop. The output of each set gate is connected to set its corresponding grant flip-flop if the set gate is fully enabled. The lowest priority level's ask flip-flop is connected directly to set its grant flip-flop thus making the lowest priority logic path the shortest logical path.

An ask reset signal is derived by delaying the initiate signal. The ask reset signal returns to the non-reset state to start a priority resolution cycle after the request cut-off signal assumes the request enable state which partially enables all set gates before a priority resolution cycle begins.

Because the logic associated with the lowest priority level does not contain a set gate between its ask and grant flip-flops, the lowest priority request can initiate a request for the shared resource in less time than any other priority level. Logic is also provided for the early resetting of individual grant flip-flops. By ORing the outputs of any priority level's grant and ask flip-flops, a signal can be provided to determine if the priority level is finished with the shared resource.

BRIEF DESCRIPTION OF THE DRAWINGS

The manner in which the method of the present invention is performed and the manner in which the apparatus of the present invention is constructed and its mode of operation can best be understood in light of the following detailed description together with the accompanying drawings in which like reference numbers identify like elements in the several figures and in which.

DESCRIPTION OF THE PREFERRED EMBODIMENT

Figure 2:
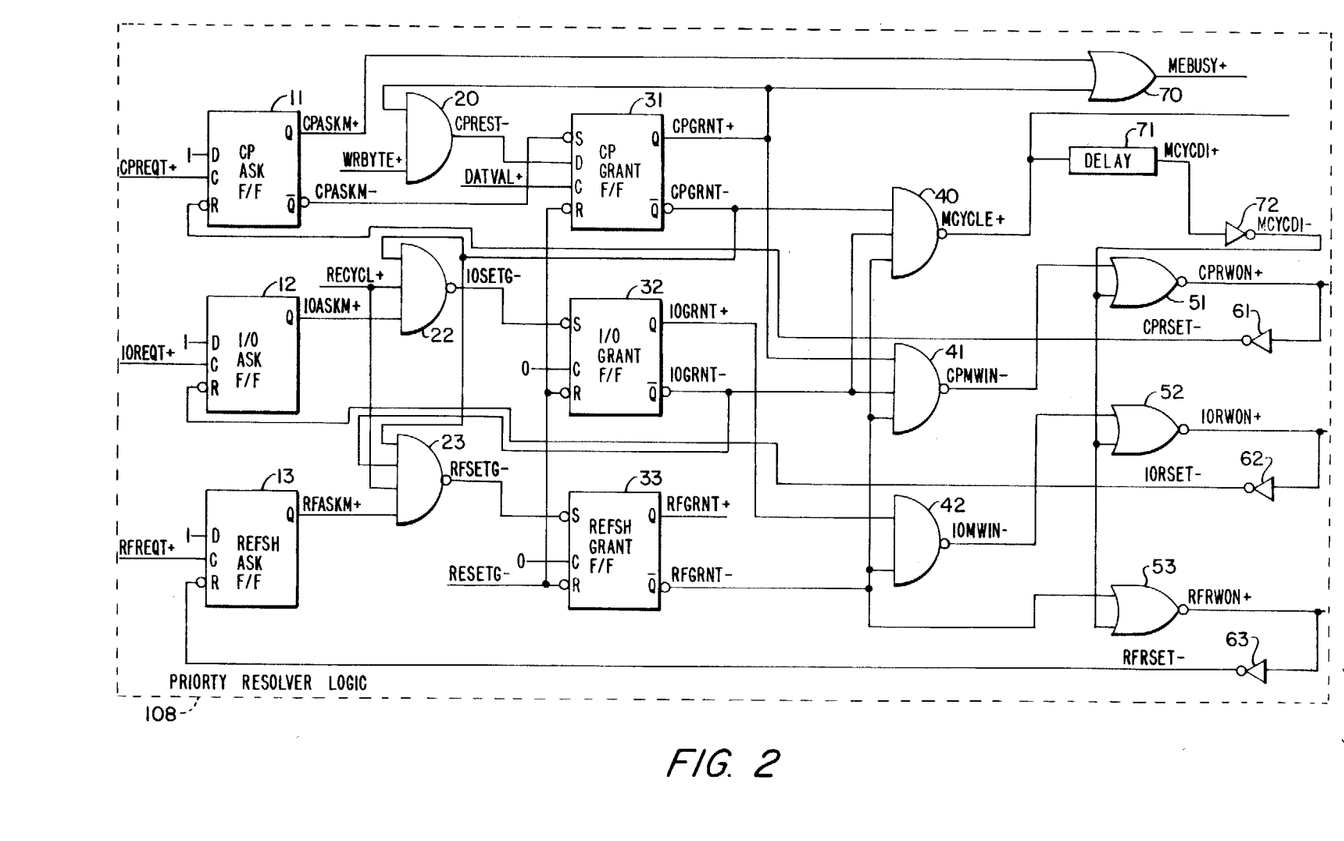
FIG. 2 is a logic block diagram of the priority resolver of the present invention.

FIG. 2 is a logic block diagram of priority resolver logic 108 within main memory 102 of FIG. 1. In FIG. 2, the small circles on the inputs or outputs of the logic elements represent inverting inputs and outputs respectively. FIG. 2 illustrates the resolver logic of the preferred embodiment and is used to resolve competing requests from the CPU 101, the common bus 107 originating from I/O controllers 103 and 104, and refresh logic 109 (see FIG. 1). The principles of this invention, however, are applicable to resolving competing requests from two to N devices by either reduction or extension as applicable.

Turning now to FIG. 2, the layout of the logic block diagram is such that horizontal rows across the page are more or less associated with individual priority levels. The logic elements associated with the lowest priority level occupying the top of the figure, the logic elements associated with a medium priority level occupying the center of the figure, and the logic elements associated with the highest priority occupying the bottom of the figure. FIG. 2 is also laid out with the logic elements performing similar function arranged in vertical columns with one column being comprised of CP ask flip-flop 11, I/O ask flip-flop 12, and refresh ask flip-flop 13. The second column being comprised of NAND gates 22 and 23, a third column being comprised of CP grant flip-flop 31, I/O grant flip-flop 32, and refresh grant flip-flop 33. A fourth column is comprised of NAND gates 40, 41 and 42 with a fifth column being comprised of NOR gates 51, 52 and 53 and a sixth column being comprised of inverter 61, 62 and 63.

Individual ask flip-flops 11, 12 and 13 are set individually each time their corresponding device makes a request for a memory cycle to perform a read, write or memory refresh operation. The individual ask flip-flops stay set until the requests for memory has been honored for that particular device. For example, if the CPU 101 wants a memory cycle, signal CPREQT+ at the clock (C) input of CP ask flip-flop 11 will pulse (transition from the binary ZERO to the binary ONE state and return to the binary ZERO state) and clock the binary ONE at the data (D) input and thereby set the flip-flop causing the output (Q) signal CPASKM+ to become a binary ONE and the inverted (Q-bar) output, signal CPASKM−, to become a binary ZERO. Similarly, I/O ask flip-flop 12 is set by signal IOREQT+ transitioning to the binary ONE state and refresh ask flip-flop 13 is set by signal RFREQT+ transitioning to the binary ONE state. Ask flip-flops 11, 12 and 13 can be set at any time during a memory cycle independent of where in the memory cycle the memory is, or where the priority resolution process, the priority resolver logic 108 is.

As will be seen below, the ask flip-flop associated with the priority level that actually ends up winning a memory cycle will be reset once the winning priority level has been determined. This resetting of the ask flip-flop is done by a binary ZERO signal appearing at the reset (R) input of the ask flip-flop 11, 12 or 13 as applicable. The ask flip-flop of the winning priority level is reset relatively early within a memory cycle and once reset that ask flip-flop may be set by a subsequent request from the same device so that the same priority level may compete for the next memory cycle.

Individual grant flip-flops 31, 32 and 33 are set at the beginning of each priority resolution cycle if the corresponding ask flip-flop is set at the beginning of the priority resolution cycle. For example, I/O grant flip-flop 32 will be set at the beginning of a priority resolution cycle if I/O ask flip-flop 12 is set at the beginning of the priority resolution cycle. As many grant flip-flops 31, 32 and 33 will be set as there are ask flip-flops set at the beginning of the priority resolution cycle. All grant flip-flops are reset at the end of each priority resolution cycle. The purpose of grant flip-flops 31, 32 and 33 is to produce a stable, glitch-free, signal indicating whether or not the corresponding ask flip-flop for the associated priority level was set at the beginning of a priority resolution cycle. Grant flip-flops 31, 32 and 33 are individually set by binary ZERO signals appearing at their set (S) inputs at the beginning of a priority resolution cycle and are reset by a binary ZERO cycle appearing at their reset (R) inputs. As can be seen, the reset signal for grant flip-flops 31, 32 and 33 is the common signal RESETG− which becomes a binary ZERO at the end of each priority resolution cycle. When signal RESETG− returns to the binary ONE state, the next priority resolution cycle starts to determine the highest priority requester among these that have already set their ask flip-flops. The binary ONE to binary ZERO transition of signal RESETG− is derived by delaying the binary ZERO to binary ONE transition of signal MCYCLE+ (see FIG. 3) by logic not shown in FIG. 2. The binary ZERO to binary ONE transition of signal RESETG− is derived from the binary ZERO to binary ONE transition of signal RECYCL+ (see FIG. 3) by logic not shown in FIG. 2. That is, the falling edge of signal RESETG− is derived from the rising edge of signal MCYCLE+. The rising edge of signal RESETG− is derived from the rising edge of signal RECYCL+ thus assuring that NAND gates 22 and 23 will be partially enabled by signal RECYCL+ becoming a binary ONE before the next priority resolution cycle is started by signal RESETG− becoming a binary ONE.

NAND gates 22 and 23 prevent a higher priority request coming in and setting its corresponding grant flip-flop after a lower priority request has already won the shared resource cycle. There is no NAND gate associated with CP grant flip-flop 31 because there is no device capable of making a request that is lower in priority than the CPU request. NAND gates 22 and 23 each have as inputs the RECYCL+ signal which becomes a binary ONE before the beginning of a priority resolution cycle and thereby partially enables the NAND gates. Each NAND gate 22 and 23 also receives the Q output of its corresponding ask flip-flop which will be a binary ONE if its corresponding ask flip-flop is set to indicate that the priority level is making a request for the shared resource. In addition, NAND gates 22 and 23 each receive the Q-bar output of all the grant flip-flops associated with lower priority requests. That is, NAND gate 22 receives signal CPGRNT− from CP grant flip-flop 31 and NAND gate 23 receives signal CPGRNT− from CP grant flip-flop 31 and also signal IOGRNT− from I/O grant flip-flop 32. NAND gate 22 prevents the setting of I/O grant flip-flop 32 by inhibiting the output of I/O ask flip-flop 12 if it is late in a priority resolution cycle such that signal RECYCL+ has become a binary ZERO or if CP grant flip-flop 31, which is lower priority, has already been set even though signal RECYCL+ has not yet become a binary ZERO. Similarly, NAND gate 23 prevents the setting of refresh grant flip-flop 33 by the output of refresh ask flip-flop 13 if it is late in the priority resolution cycle such that RECYCL+ has become a binary ZERO or if either CP grant flip-flop 31 or I/O grant flip-flop 32 is already set even though signal RECYCL+ is still a binary ONE. Both the binary ONE to binary ZERO transition and the binary ZERO to binary ONE transition of signal RECYCL+ are derived by delaying the binary ZERO to binary ONE transition of signal MCYCLE+ (see FIG. 3) by logic not shown in FIG. 2. That is, both the falling and rising edges of signal RECYCL+ are derived from the rising edge of signal MCYCLE+. It should be noted the signal RECYCL+ becomes a binary ONE before signal RESETG− becomes a binary ONE at the beginning of a priority resolution cycle so that NAND gates 22 and 23 will be partially enabled at the beginning of a priority resolution cycle so that if their corresponding ask flip-flop is set, the binary ZERO output by NAND 22 and/or 23 will have time to set their corresponding grant flip-flop 32 and/or 33 before possibly being cut off by the setting of a lower priority grant flip-flop.

NAND gates 41 and 42 along with NOR gates 51, 52 and 53 are used to determine which of the three priority levels has actually (really) won the shared resource. The output of NAND gate 41 or 42 will be a binary ZERO if its corresponding grant flip-flop is set and no grant flip-flop associated with a higher priority request is set. For example, the output of NAND gate 41, signal CPMWIN−, will be a binary ZERO indicating that the CPU is the highest priority device making a request for the shared resource if CPU grant flip-flop 31 is set and if I/O grant flip-flop 32 and refresh grant flip-flop 33 are not set. Similarly, the output of NAND gate 42, signal IOMWIN−, will be a binary ZERO indicating that that I/O request is the highest priority request of the shared resource if I/O grant flip-flop 32 is set and refresh grant flip-flop 33 is not set. Because the refresh request is the highest priority requester, there is no NAND gate associated with the output of refresh grant flip-flop 33 and the Q-bar output of refresh grant flip-flop 33, signal RFGRNT−, is used directly and will be a binary ZERO if the refresh request is the highest priority requester for the shared resource.

Because the number of logical elements in the priority resolution path for each priority level is not the same, (i.e., there is no NAND gate between CP ask flip-flop 11 and CP grant flip-flop 31 and there is no NAND gate after refresh grant flip-flop 33) and because the signal propagation time within the individual electronic components of the same type varies within certain tolerances, the output of NAND gates 41 and 42 and grant flip-flop 33 cannot be used directly to determine who the ultimate winner of the shared resource is in cases where there is more than one ask flip-flop 11, 12 and 13 set at the beginning of a priority resolution cycle. For example, assume that both an I/O device has made a request, so that I/O ask flip-flop 12 is set, and that the memory desires to perform a memory refresh cycle, so that refresh ask flip-flop 13 is also set, at the beginning of a priority resolution cycle. At the end of the priority resolution cycle grant flip-flop 31, 32 and 33 are reset by signal RESETG− becoming a binary ZERO. Before the beginning of the next priority resolution cycle, signal RECYCL+ becomes a binary ONE partially enabling NAND gates 22 and 23. At the beginning of a priority resolution cycle, signal RESETG− becomes a binary ONE allowing grant flip-flop 31, 32 and 33 to be set if their set (S) input is a binary ZERO. With grant flip-flops 31, 32 and 33 in the reset state, the signal at their Q-bar output, signal CPGRNT−, IOGRNT−, and RFGRNT−, respectively, will each be a binary ONE. With signal IOASKM+ being a binary ONE at the Q output of I/O ask flip-flop 12, all of the three inputs to NAND gate 22 are in the binary ONE state. Similarly, with signal RFASKM+ at the Q output of refresh ask flip-flop 13 being in the binary ONE state, all of the four inputs to NAND gate 23 are in the binary ONE state. Thus, signal IOSETG− at the output of NAND gate 22 will become a binary ZERO at approximately the same time that signal RFSETG− becomes a binary ZERO at the output of NAND gate 23. These binary ZEROs will respectively set their corresponding grant flip-flops 32 and 33 after signal RESETG− becomes a binary ONE at their reset (R) input at the beginning of a priority resolution cycle.

Continuing the example, if I/O grant flip-flop 32 is a little faster in setting than refresh grant flip-flop 33, signal IOGRNT+ and IOGRNT− at the outputs of I/O grant flip-flop 32 will become a binary ONE and a binary ZERO, respectively, slightly ahead of signal RFGRNT− becoming a binary ZERO at the output of refresh grant flip-flop 33. The binary ZERO of signal IOGRNT− will disable NAND gate 23 and cause its output, signal RFSETG−, to become a binary ONE but this will not prevent refresh grant flip-flop 33 from setting because the binary ZERO at its set (S) input will have had sufficient time to cause it to set. With signal IOGRNT+ becoming a binary ONE, while signal RFGRNT− remains binary ONE, the output of NAND gate 42, signal IOMWIN−, will become a binary ZERO indicating that the I/O request may win the shared resource. When refresh grant flip-flop 33 finally sets slightly after I/O grant 32, signal RFGRNT− will become a binary ZERO thus disabling NAND gate 42 and causing its output, signal IOMWIN−, to become a binary ONE while the RFGRNT− signal from refresh grant flip-flop 33 becomes a binary ZERO indicating that the refresh request is the highest priority request for the shared resource. Thus, it can be appreciated that the output of NAND gates 41 and 42 and refresh grant flip-flop 33, which indicates the highest priority requester, may change within a given priority resolution cycle. Thus, in a priority resolution cycle, the early outputs indicate a possible winner of the shared resource while the later outputs indicate the real winner. These may win signals output by NAND gates 41 and 42 can be used advantageously to begin steering other signals within the memory before the real winner is determined.

NAND gates 41 and 42 have as one input the Q output signal of their associated grant flip-flop and as other inputs the Q-bar output of all higher priority grant flip-flops. Thus, NAND gate 41 has an inputs the Q output of CP grant flip-flop 31, which is signal CPGRNT+, the Q-bar output of I/O grant flip-flop 32, which is signal IOGRNT−, and the Q-bar output of refresh grant flip-flop 33, which is signal RFGRNT−.

The output of NAND gate 40 is used to indicate that there is at least one legitimate request for use of the shared resource. NAND gate 40 is connected to the Q-bar output of each of the grant flip-flops 31, 32 and 33 and therefore if any grant flip-flop is set, making its Q-bar output signal a binary ZERO, the output of NAND gate 40, signal MCYCLE+, will become a binary ONE indicating that a legitimate request is coming for the shared resource. The output for NAND gate 40 transitions to the binary ONE state in response to the setting of any one of the grant flip-flops and can therefore be used to initiate a cycle within the shared resource even before the final priority winner is determined. Thus, in the preferred embodiment, the output of NAND gate 40, signal MCYCLE+, when it transitions to the binary ONE state, is used to initiate the beginning of a memory cycle even before the ultimate user of the memory is determined.

The output of NAND gate 40, signal MCYCLE+, is delayed by delay 71 a sufficient time to allow all of the grant flip-flops 31, 32 and 33 to set that eventually will set within any given priority resolution cycle. In a preferred embodiment where the setting time of the grant flip-flops is approximately 5 nanoseconds and the propagation delay within NAND gates 22 and 23 is also approximately 5 nanoseconds, the time delay within delay 71 is approximately 50 nanoseconds. This delay time of 50 nanoseconds is dependent upon the type of circuits used for grant flip-flops 31, 32 and 33.

This delay time must be sufficient to allow the outputs of grant flip-flops 31, 32 and 33 to stabilize in response to any set pulse having a width of less than the minimum specified for the grant flip-flops. These below specification set pulses on the set (S) inputs of grant flip-flops 32 and 33 can arise because a late setting ask flip-flop 12 or 13 can cause a short set pulse to be output by NAND gate 22 or 23, respectively, until the NAND gate is disabled by the Q-bar output of lower priority grant flip-flops 31 or 32, respectively.

Fifty nanoseconds after signal MCYCLE+ transitions to the binary ONE state, signal MCYCD1+ at the output of delay 71 transitions to the binary ONE state.

Signal MCYCD1+ is inverted by inverter 72 to produce signal MCYCD1−. Signal MCYCD1− is one input to NOR gates 51,52 and 53. The other inputs to NOR gates 51, 52 and 53 are signal CPMWIN− from NAND gate 41, signal IOMWIN− from NAND gate 42, and signal RFGRNT− from refresh grant flip-flop 33 respectively. When signal MCYCD1− transitions from the binary ONE to the binary ZERO state near the beginning of a memory cycle after allowing sufficient time for grant flip-flops 31, 32 and 33 to set and for their output to propagate through NAND gates 41 and 42, the output of NOR gates 51, 52 and 53 will be determined only by their other inputs, signal CPMWIN−, signal IOMWIN−, and signal RFGRNT− respectively.

At this point in time only one of signals CPMWIN−, IOMWIN− and RFGRNT− will be a binary ZERO and the other two will be binary ONEs. The signal that is a binary ZERO corresponds to the priority level that has the highest priority level requesting use of the shared resource. The output of NOR gates 51, 52 and 53 which has two binary ZEROs as inputs will be a binary ONE indicating that the associated priority level has won use of the shared resource and the output of the other two NOR gates will be binary ZEROs indicating that their associated priority levels have not won use of the shared resource.

For example, if I/O grant flip-flop 32 is set and CP grant flip-flop 31 and refresh grant flip-flop 33 are not set, the output of NAND gate 42, signal IOMWIN−, will be a binary ZERO and cause the output of NOR 52, signal IORWON+, to be a binary ONE indicating that the I/O request is the highest priority level requesting use of the shared resource during this priority resolution cycle and therefore the memory cycle which has already begun will be used by the I/O request which was made via common bus 107.

The outputs of NOR gates 51, 52 and 53 are inverted by inverters 61, 62 and 63 respectively producing signals CPRSET−, IORSET−, and RFRSET− respectively. These reset signals are fed back to the reset (R) input of their corresponding ask flip-flop 11, 12 and 13 so that the device that has won use of the shared resource during this priority resolution cycle will reset its corresponding ask flip-flop thereby allowing a subsequent request from that device to be made for the shared resource.

For example, assuming that the I/O request was the highest priority request and therefore IORWON+ at the output of NOR gate 52 is a binary ONE, the output of inverter 62, signal IORSET−, will become a binary ZERO which when present at the reset input of I/O ask flip-flop 12 will reset the flip-flop. Signal IORSET− will return to the binary ONE state thus allowing I/O ask flip-flop 12 to be set by request signal IOREQT+ at the clock input of I/O ask flip-flop 12 when the I/O grant flip-flop 32 is reset by signal RESETG− becoming a binary ZERO.

From the above discussion it can be appreciated that ask flip-flops 11, 12 and 13 are used to store requests for use of the shared resource by their associated device, that grant flip-flops 31, 32 and 33 are used to produce a glitch-free signal indicating that the corresponding priority level may be granted access to the shared resource during this priority resolution cycle. These grant flip-flops are reset during each resolution cycle. NAND gates 22 and 23 are used to inhibit a late arriving, higher priority request from changing the award of the shared resource after the priority resolution cycle has begun. The output of NAND gate 40 is used to indicate that the shared resource is about to be allocated to a requester and that the shared resource may begin a cycle. The output of NOR gates 51, 52 and 53 is used to indicate which priority level has really won the use of the shared resource.

It should be noted that the lack of a NAND gate between the Q-bar output of CP ask flip-flop 11 and the set (ask) input of CP grant flip-flop 31 causes no problem. If a priority resolution cycle has already begun because of either an I/O request or a refresh request, a late arriving CP request will set CP ask flip-flop 11 which in turn will cause CP grant flip-flop 31 to set irrespective or where in the priority resolution cycle the CPU request comes in (unless signal RESETG− at the reset (R) input of CP grant flip-flop 31 is in the binary ZERO state). This late setting of CP grant flip-flop 31 will not cause the CPU to win the shared resource even though CPGRNT+ becomes a binary ONE, the output of NAND gate 41 will not change because at least one of the higher priority grant flip-flops 32 or 33 will be set causing at least one of signals IOGRNT− and RFGRNT− to be a binary ZERO.

The absence of a NAND gate between the ask flip-flop and the grant flip-flop in logic path of the lowest priority level has the advantage that the lowest priority requester can initiate a request for the shared resource in the shortest time. Thus, a CPU request will result in the initiation of a memory cycle in less time than will an I/O or refresh request made at the same time. Within the data processing system of the preferred embodiment, this results in the speed-up of program execution because the CPU will be idle for less time while waiting for the main memory to do the requested operations.

Although the above description discusses the primary operation of the priority resolver logic 108 illustrated in FIG. 2, there is a further aspect which in the preferred embodiment is associated with CPU requests for the main memory. In the preferred embodiment, data is transferred between the CPU 101 and volatile RAM array 110 of main memory 102 via means of an input/output buffer. Data to be written into main memory is placed in this input/output buffer by the CPU and data that is read out of main memory on behalf of the CPU is placed in this input/output buffer by volatile RAM array 110.

Signal MEBUSY+ at the output of OR gate 70 is used to indicate to the CPU when the data in the input/output buffer has been taken by the main memory during a write into memory operation and when it has been placed in the input/output buffer by the main memory during a read operation and is therefore available to the CPU. When signal MEBUSY+ is a binary ONE it indicates to the CPU that the memory operation has not been completed on behalf of the CPU. Signal MEBUSY+ is derived by ORing the Q output of CP ask flip-flop 11 and CP grant flip-flop 31. If either flip-flop 11 or 31 is set, it indicates to the CPU that the main memory has not completed the operation on behalf of the CPU. Thus, if CP ask flip-flop 11 is still set it indicates that the main memory has other requests and that the CPU request has not yet become the highest priority memory request outstanding.

Because CP ask flip-flop 11 is reset relatively near the beginning of a memory cycle by signal CPRSET− becoming a binary ZERO early in a memory cycle when the CPU has actually won the main memory, the output of CP grant flip-flop 31 is also ORed with the output of CP ask flip-flop 11 because the CP grant flip-flop 31 is reset near the end of the memory cycle whether or not the CPU has been granted the main memory. Therefore, it is only when both the CP ask flip-flop 11 and the CP grant flip-flop 31 have been reset that the CPU can be sure that the input/output buffer is available for use when the signal MEBUSY+ becomes a binary ZERO. A similar method could be used by ORing the outputs of I/O ask flip-flop 12 and I/O grant flip-flop 32 to determine when data has become available to common bus 107.

In the preferred embodiment, information is usually read from and written into main memory a word at a time where a word consists of a two 8-bit bytes. However, information may also be written into main memory a byte at a time. When words of information are accessed on behalf of the CPU, the input/output buffer becomes available about three-fourths of the way through the memory cycle. That is, when a word of information is to be written into the main memory on behalf of the CPU, the memory word is taking from the input/output buffer between the CPU and main memory about three-fourths of the way through the memory cycle thus freeing up the input/output buffer for its next use by the CPU. Alternatively, if a word of information is being read from memory on behalf of the CPU, the information becomes available in the CPU input/output buffer at approximately three-fourths of the way through the memory cycle thus allowing the CPU to begin processing the word from memory. However, when a byte of information is written into the main memory on behalf of the CPU, the byte of data is only taken from the input/output buffer toward the end of the memory cycle and therefore the input/output buffer is not freed up until near the end of the memory cycle.

To take advantage of this early freeing up of the input/output buffer during word access operations, logic is provided to reset CP grant flip-flop 31 approximately three-fourths of the way through a memory cycle during non-byte write operations. This is done by signal DATVAL+ transitioning from the binary ZERO the binary ONE state at the clock (C) input of CP grant flip-flop 31 approximately three-fourths of the way through a memory cycle. Signal DATVAL+ is derived by delaying signal MCYCLE+ approximately three-fourths of the time of a complete memory cycle. Both the binary ZERO to binary ONE transition and the binary ONE to binary ZERO transition of signal DATVAL+ are derived by delaying the binary ZERO to binary ONE transition of signal MCYCLE+ (see FIG. 3) by logic not shown in FIG. 2. That is, both the rising and falling edges of signal DATVAL+ are derived from the rising edge of signal MCYCLE+. This clocking signal is used to clock signal CPREST− at the data (D) input of CP grant flip-flop 31. If signal CPREST− is a binary ZERO, then when it is clocked into CP grant flip-flop 31, it will reset grant flip-flop 31 and thus make signal MEBUSY+ at the output of OR gate 70 a binary ZERO thereby indicating that the memory is no longer busy on behalf of the CPU and that the input/output buffer is free to be loaded with more data to be written into the memory or data read from the memory is available in the input/output buffer for processing by this CPU. Thus, during a non-byte write operation, CP grant flip-flop 11 will be reset relatively early within the memory cycle by signal CPRESET− becoming a binary ZERO and CP grant flip-flop 31 will be reset three-fourths of the way through the cycle by signal DATVAL+ transitioning to the binary ONE state and clocking the binary ZERO at the data input.

Signal CPREST− is derived by ANDing together signal CPGRNT+ and signal WRBTYE+ by AND gate 20. Signal CPGRNT+ will be a binary ONE if the CP ask flip-flop 11 was set. WRBYTE+ will be a binary ONE if a memory write byte operation is being performed. Signal CPGRNT+ will be a binary ZERO if CP grant flip-flop 31 is not set, indicating that CP ask flip-flop 11 is not set. Signal WRBYTE+ will be a binary ZERO if a word read or write operation is being performed.

Thus, if CP ask flip-flop 11 is set, the output of AND gate 20 will be determined solely by the signal WRBYTE+ which will be a binary ONE if a byte write operation is being performed thus making the signal CPREST− a binary ONE which when clocked into CP grant flip-flop 31 by signal DATVAL+ three-fourths of the way through the memory cycle will result in the CP grant flip-flop 31 not being reset. However, if a word operation is being performed, signal WRBYTE+ will be a binary ZERO, and, when clocked into CP grant flip-flop 31 by signal DATVAL+ three-fourths of the way through a memory cycle, will result in the early resetting of CP grant flip-flop 31 and the early indication to the CPU that the input/output buffer is free by signal MEBUSY+ becoming a binary ZERO.

During a byte write operation, the early clocking of signal CPREST− by signal DATVAL+ three-fourths of the way through a memory cycle will not reset CP grant flip-flop 31 and it will be reset along with I/O grant flip-flop 32 and refresh grant flip-flop 33 by signal RESETG− becoming a binary ZERO at the end of the memory cycle. At this time, signal MEBUSY+ will also become a binary ZERO indicating to the CPU that the input/output buffer is now free.

Only the lowest priority grant flip-flop can be reset early because the early resetting of a higher priority grant flip-flop would change the results of the priority resolver by changing the output of NAND gates 41 or 42.

Figure 3:
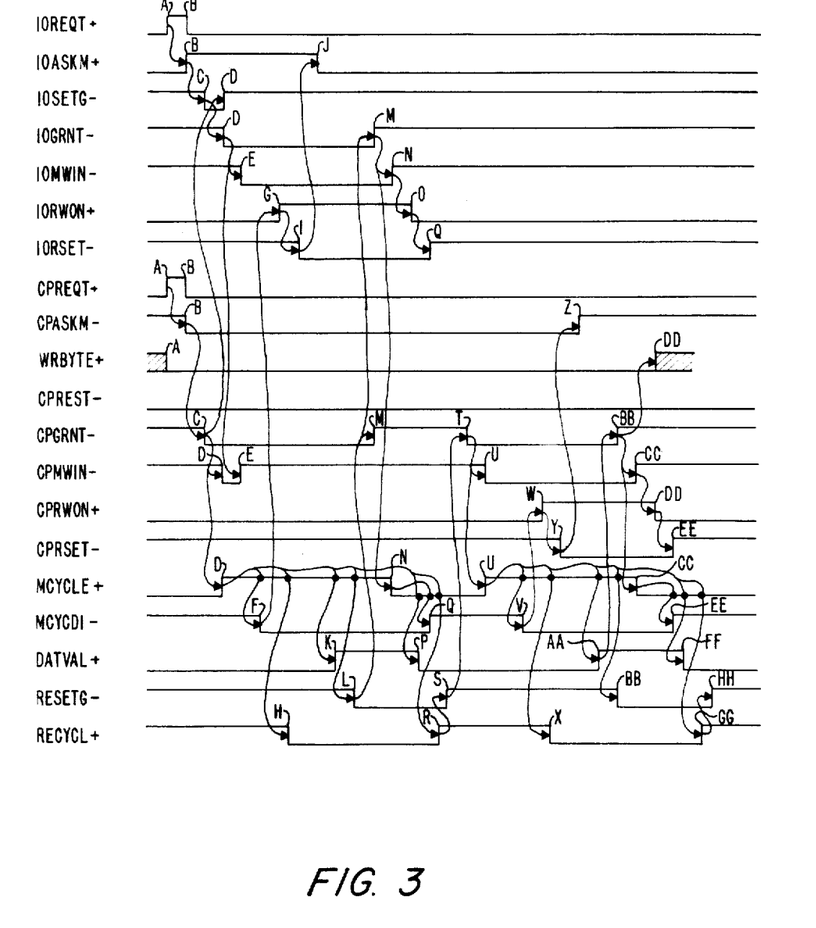
FIG. 3 illustrates a timing diagram of the various signals as they propagate through the priority resolver logic of FIG. 2.

The priority resolution logic of FIG. 2 will now be discussed with reference to the timing diagram of FIG. 3 which shows the priority resolution between two competing requests for main memory. FIG. 3 illustrates the case in which a CPU request and an I/O request for the main memory arrive simultaneously. In FIG. 3, the propagation time within the logic elements such as flip-flops, NAND gates, OR gates and NOR gates is all assumed to be of equal time in order to simplify the diagram.

Starting conditions for the case illustrated in FIG. 3 are such that any previous memory cycle or priority resolution cycle has been completed and all ask flip-flops 11, 12 and 13 are reset as are all grant flip-flops 31, 32 and 33. Because signal CPGRNT+ is a binary ZERO at the output of CP grant flip-flop 31, the output of AND gate 20, signal CPREST−, is a binary ZERO at the data (D) input of CP grant flip-flop 31. In addition, signal RECYCL+ is a binary ONE such that NAND gates 22 and 23 are partially enabled and grant flip-flop reset signal RESETG− is a binary ONE.

In FIG. 3, at time A both an I/O controller and a CPU make simultaneous requests for use of the main memory, the shared resource, by the signals IOREQT+ and CPREQT+ transitioning from the binary ZERO to the binary ONE state. Signal WRBYTE+ also is set by the CPU to indicate that the type of memory operation to be performed on behalf of the CPU is not a byte write operation.

These request signals set their corresponding ask flip-flops such that I/O ask flip-flop 12 is set causing its Q output signal, IOASKM+ to transition from the binary ZERO to the binary ONE state and CP ask flip-flop is set causing its Q-bar output, signal CPASKM−, to transition from the binary ONE to the binary ZERO state at time B. Also, at time B, the request pulses IOREQT+ and CPREQT+ return to the binary ZERO state.

At time C, NAND gate 22 is fully enabled causing its output, signal IOSETG−, to transition from the binary ONE to the binary ZERO state and, at the same time, CP grant flip-flop 31 becomes set causing its output signal, signal CPGRNT−, to transition from the binary ONE to the binary ZERO state. At this point, CP grant flip-flop 31 has already set whereas the binary ZERO to set I/O grant flip-flop 32 has just become available at its set (S) input.

At time D, NAND gate 22 becomes disabled by the signal CPGRNT− being a binary ZERO thus causing its output, signal IOSETG−, to transition from the binary ZERO to the binary ONE state and, at the same time, I/O grant flip-flop 32 becomes set causing its output, signal IOGRNT, to transition from the binary ONE to the binary ZERO state. Also at time D, the binary ZERO of signal CPGRNT− has propagated through NAND gate 40 causing its output, signal MCYCLE+, to transition from the binary ZERO to the binary ONE state thus signalling the beginning of a memory cycle, in which one of the three devices will need access to the memory. This early signalling allows memory to begin a memory cycle even before the ultimate (real) winner is determined. This example illustrates that the lowest priority level has the shortest logic path for purposes of initiating a memory cycle because signal MCYCLE+ became a binary ONE in response to the setting of CP grant flip-flop 31 and not in response to the setting of I/O grant flip-flop 32 which is yet to set and will eventually win the memory cycle. Simultaneously with this at time D, the binary ONE of signal CPGRNT+ has propagated through NAND gate 41 causing its output signal, CPMWIN−, to transition from the binary ONE to the binary ZERO state indicating that the CPU may win access to the shared resource. Therefore, at time D, both CP grant flip-flop 31 and I/O grant flip-flop 32 are set and a main memory cycle has been initiated.

At time E, signal IOMWIN− transitions from the binary ONE to the binary ZERO state indicating that the I/O controller may win access to the main memory. This transition is caused by the binary ONE of of signal IOGRNT+ propagating through NAND gate 42. At the same time, the binary ZERO of signal IOGRNT− has propagated through NAND gate 41 causing its output, signal CPMWIN−, to transition from the binary ZERO to the binary ONE state thus indicating that the CPU will not win access to the main memory.

At time F, signal MCYCLE+ has propagated through delay 71 and inverter 72 thus causing the output of inverter 72, signal MCYCD1−, to transition from the binary ONE to the binary ZERO state.

At time G, signal MCYCD1− has propagated through NOR gates 51, 52 and 53 resulting in signal IORWON+ transitioning from the binary ZERO to the binary ONE state, indicating that the I/O controller has really won access to the main memory and that neither the CPU nor the refresh is the winner of the shared resource.

At time H, the binary ZERO to binary ONE transition of signal MCYCLE+ has been delayed and signal RECYCL+ transitions from the binary ONE to the binary ZERO state thus disabling NAND gates 22 and 23 to prevent any late setting of ASK flip-flops 12 or 13, due to late arriving requests, from setting grant flip-flops 32 or 33 once the priority resolution cycle has progressed to this point in time.

At time I, signal IORWON+ has been inverted by inverter 62 and signal IORSET− transitions from the binary ONE to the binary ZERO state thus indicating to I/O ask flip-flop 12 that it should reset. This resetting permits the winning requester to initiate another request for the shared resource upon completion of the current request.

At time J, I/O ask flip-flop 12 has reset causing its output, signal IOASKM+, to transition from the binary ONE to the binary ZERO state.

At time K, the binary ZERO to binary ONE transition of signal MCYCLE+ has been delayed for approximately ¾ of a memory cycle and signal DATVAL+ transitions from the binary ZERO to the binary ONE state thus clocking CP grant flip-flop 31 so that this grant flip-flop may be reset earlier than would otherwise be done by signal RESETG− transitioning to the binary ZERO state. However, in this case, although signal CPREST− is a binary ZERO at the data (D) input of CP grant flip-flop 31, signal CPASKM− is a binary ZERO at the set (S) input because the CP ask flip-flop 11 is still set and therefore CP grant flip-flop 31 remains set.

At time L, the binary ZERO to binary ONE transition of signal MCYCLE+ has been delayed and signal RESETG− transitions from the binary ONE to the binary ZERO state for use in resetting grant flip-flops 31, 32 and 33.

At time M, both grant flip-flops 31 and 32 have been reset by the binary ZERO signal at their reset (R) inputs thus making their Q-bar outputs, signals CPGRNT– and IOGRNT–, binary ONEs. This resetting of grant flip-flops is done in preparation of beginning a new priority resolution cycle to determine the next winner of the shared resource.

At time N, the binary ZERO of signal IOGRNT+ has propagated through NAND gate 42 making its output, signal IOMWIN–, a binary ONE. In addition, the binary ONE of signal IOGRNT– has propagated through NAND gate 40 making its output, signal MCYCLE+, a binary ZERO to indicate the end of a memory cycle.

At time O, the binary ONE of signal IOMWIN– has propagated through NOR gate 52 making its output, signal IORWON+, a binary ZERO.

At time P, the binary ZERO to binary ONE transition of signal MCYCLE+ has been delayed sufficiently such that signal DATVAL+ transitions from the binary ONE to the binary ZERO state.

At time Q, the binary ZERO of signal IORWON+ has propagated through inverter 62 causing its output, signal IORSET–, to transition from the binary ZERO to the binary ONE state. This removes the binary ZERO from the reset (R) input of I/O ask flip-flop thus permitting a subsequent request to set it by signal IOREQT+ transitioning from the binary ONE to the binary ZERO state. If it is desired to allow subsequent requests to set ask flip-flops 11, 12 and 13 sooner in the cycle (i.e., closer to time I when it was reset), logic could be added to return the reset signals CPRSET–, IORSET– and RFRSET– to the binary ONE state sooner in the cycle. Also at time Q, the binary ONE to binary ZERO transition of signal MCYCLE+ has propagated through delay 71 and inverter 72 causing signal MCYCD1– to transition from the binary ZERO to the binary ONE state.

At time R, the binary ZERO to binary ONE transition of signal MCYCLE+ has been delayed and signal RECYCL+ transitions from the binary ZERO to the binary ONE state partially enabling NAND gates 22 and 23 for the next priority resolution cycle.

At time S, the binary ONE of signal RECYCL+ causes signal RESETG– to transition from the binary ZERO to the binary ONE state thus removing the binary ZERO from the reset (R) inputs of grant flip-flops 31, 32 and 33 and thus beginning the next priority resolution cycle.

As discussed above, it should be noted that the signal RECYCL+ becomes a binary ONE at time R before signal RESETG– becomes a binary ONE at time S so that NAND gates 22 and 23 are enabled in sufficient time to allow their output signals to become binary ZEROs before the next priority resolution cycle is begun.

At time T, the binary ZERO of signal CPASKM– from CP ask flip-flop 11, which is input to the set (S) input of CP grant flip-flop 31, has resulted in its setting causing its output, signal CPGRNT–, to transition from the binary ONE to the binary ZERO state.

At time U, the binary ONE of signal CPGRNT+ has propagated through NAND gate 41 making its output, signal CPMWIN–, transition from a binary ONE to the binary ZERO state. Also at time U, the binary ZERO of signal CPGRNT– has propagated through NAND gate 40 making its output, signal MCYCLE+, transition from the binary ZERO to the binary ONE state thus indicating the beginning of a memory cycle even though, as yet, the real winner of the shared resource has not been determined.

At time V, the binary ZERO to binary ONE transition of signal MCYCLE+ has propagated through delay 71 and inverter 72 causing signal MCYCD1– to transition from the binary ONE to the binary ZERO state.

At time W, signal MCYCD1– has propagated through NOR gates 51, 52 and 53 resulting in signal CPRWON+ transitioning from the binary ZERO to the binary ONE state indicating that the CPU has really won access to the main memory and that neither the I/O controller nor the refresh is the winner of the shared resource.

At time X, the binary ZERO to binary ONE transition of signal MCYCLE+ has been delayed and signal RECYCL+ transitions from the binary ONE to the binary ZERO state thus disabling NAND gates 22 and 23 to prevent any late setting of ASK flip-flops 12 or 13, due to late arriving requests, from setting grant flip-flops 32 or 33 once the priority resolution cycle has progressed to this point in time.

At time Y, signal CPRWON+ has been inverted by inverter 61 and signal CPRSET– transitions from the binary ONE to the binary ZERO state thus indicating to the CP ask flip-flop 11 that is should reset. This resetting permits the winning requests to initiate another request for the shared resource upon completion of the current request. As discussed above, the CPU waits until signal MEBUSY+ becomes a binary ZERO (see FIG. 2).

At time Z, CP ask flip-flop 11 has reset causing its output, signal CPASKM–, to transition from the binary ZERO to the binary ONE state.

At time AA, the binary ZERO to binary ONE transition of signal MCYCLE+ has been delayed for approximately ¾ of a memory cycle and signal DATVAL+ transitions from the binary ZERO to the binary ONE state thus clocking CP grant flip-flop 31 so that this grant flip-flop may be reset earlier than would otherwise be done by signal RESETG– transitioning to the binary ZERO state. In this case, signal CPREST– is a binary ZERO at the data (D) input of CP grant flip-flop 31 and signal CPASKM– is no longer a binary ZERO at the set (S) input because the CP ask flip-flop 11 has been reset and therefore CP grant flip-flop 31 will reset.

At time BB, the clocking of the binary ZERO at the data (D) input of CP grant flip-flop 31 by signal DATVAL+ has caused it to reset causing its output, signal CPGRNT–, to transition from the binary ZERO to binary ONE state. Also at time BB, the binary ZERO to binary ONE transition of signal MCYCLE+ has been delayed and signal RESETG– transitions from the binary ONE to the binary ZERO state for use in resetting grant flip-flops 31, 32 and 33. This resetting of grant flip-flop is done in preparation of beginning a new priority resolution cycle to determine the next winner of the shared resource.

At time CC, the binary ZERO of signal CPGRNT+ has propagated through NAND gate 41 making its output, signal CPMWIN–, a binary ONE. In addition, the binary ONE of signal CPGRNT– has propagated through NAND gate 40 making its output, signal MCYCLE+, a binary ZERO to indicate the end of a memory cycle.

At time DD, the binary ONE of signal CPMWIN– has propagated through NOR gate 51 making its output, signal CPRWON+, a binary ZERO. By time DD, signal MEBUSY+ (not shown in FIG. 3), which is used by the CPU to determine when the memory is done with a CPU request, has become a binary ZERO in response to the resetting of CP grant flip-flop 31 at time BB. Thus, at time DD, the CPU is free to charge signal WRBYTE+ in preparation for the next CPU memory request, once set, signal WRBYTE+ must not be changed by the CPU until clocking signal DATVAL+ transitions from the binary ZERO to the binary ONE state in the memory cycle being performed on behalf of the CPU.

At time EE, the binary ZERO of signal CPRWON+ has propagated through inverter 61 causing its output, signal CPRSET−, to transition from the binary ZERO to the binary ONE state. Also at time EE, the binary ONE to binary ZERO transition of signal MCYCLE+ has propagated through delay 71 and inverter 72 causing signal MCYCD1− to transition from the binary ZERO to the binary ONE state.

At time FF, the binary ZERO to binary ONE transition of signal MCYCLE+ has been delayed sufficiently such that signal DATVAL+ transitions from the binary ONE to the binary ZERO state.

At time GG, the binary ZERO to binary ONE transition of signal MCYCLE+ has been delayed and signal RECYCL+ transitions from the binary ZERO to the binary ONE state partially enabling NAND gates 22 and 23 for the beginning of the next priority resolution cycle.

At time HH, the binary ONE of signal RECYCL+ causes signal RESETG− to transition from the binary ZERO to the binary ONE state thus removing the binary ZERO from the reset (R) inputs of grant flip-flops 31, 32 and 33 and thus permitting next priority resolution cycle to begin if any ask flip-flop is set.

After time HH, all ask flip-flops 11, 12 and 13 and all grant flip-flops 31, 32 and 33 have been reset and the priority resolver logic is waiting for the next request to set an ask flip-flop to initiate the next priority resolution cycle.

Although the present invention has been described in terms of the preferred embodiment in which the priority resolution logic resolves priority among three requesters, as indicated above the present invention may be used to resolve priority between two through N requesters.

To reduce the logic to handle two requesters, the logic associated with the refresh request would be eliminated from FIG. 2. That is, refresh ask flip-flop 13, NAND gate 23, refresh grant flip-flop 33, NOR gate 53 and inverter 63 would be eliminated. Further, the RFGRNT− signal from the Q-bar output of refresh grant flip-flop 33 would be eliminated as an input to NAND gate 40. In addition, NAND gate 41 would become a two input NAND gate because signal RFGRNT− would be eliminated and NAND gate 42 would become a one input NAND gate or simply an inverter or eliminated altogether by replacing signal IOMWIN− at the input to NOR gate 52 with signal IOGRNT− which is output at the Q-bar output of I/O grant flip-flop 32.

To extend the logic of FIG. 2 to handle a fourth request, another row of logic similar to the bottom row of logic would be added at the bottom of the diagram. That is, an ask flip-flop 14, a NAND gate 24, a grant flip-flop 34, a NOR gate 54, an inverter 64 would be added to the bottom of the diagram. NAND gate 24 would have as inputs the Q output of ask flip-flop 14 and the Q-bar output of all lower priority grant flip-flops 31, 32 and 33. In addition, the Q-bar output of grant flip-flop 34 would have to added as an input to NAND gates 40, 41 and 42. Further, a NAND gage 43 would have to be added to receive the Q-bar output of grant flip-flop 34 along with the Q output of refresh grant flip-flop 33. The output of NAND gate 43 would replace signal RFGRNT− as an input to NOR gate 53.

From this process of reduction and extension it can be seen that NAND gates of the type 22, 23 and 24 etc., receive as inputs the Q-bar output of all lower priority grant flip-flops; NAND gate 40 receives the Q-bar output of all grant flip-flops and NAND gates of the type 41, 42 and 43 etc., receive as inputs the Q output of its associated grant flip-flop and the Q-bar outputs of all higher priority grant flip-flops.

It will be appreciated that NOR gate 51 and inverter 61 could be eliminated by feeding the output of delay 71, signal MCYCD1+, as an additional input into NAND gate 41. This would make the output of NAND gate 41, signal CPMWIN−, a really won signal, as opposed to a may win signal, and it could be used to reset the CP ask flip-flop 11 instead of signal CPRSET−. Similarly, signal MCYCD1+ could be used as an input to NAND gate 42 and eliminate the need for NOR gate 52 and inverter 62. A NAND gate 43 with inputs of signals RFGRNT+ and MCYCD1+ could be added and eliminate the need for NOR gate 53 and inverter 63. This change, although reducing the number of logic gates, has the disadvantage that the "may win" signals, CPMWIN− and IOMWIN−, which appear earlier than the "really won" signals, CPRWON+, IORWON+ and RFRWON+, are eliminated so that they are not available for use in the early steering of other signals to the memory before the ultimate (real) winner is determined.

While the invention has been shown and described with reference to the preferred embodiment thereof, it will be understood by those skilled in the art that the above and other changes in form and detail may be made therein without departing from the spirit and scope of the invention.

What is claimed is:

1. An apparatus for resolving priority requests between devices competing for access to a shared resource during a priority resolution cycle comprising:
   A. a lowest priority level logic means associated with a first device having the lowest priority and comprising:
      a. an ask means for receiving a request signal from said first device and indicating that the first device desires use of said shared resource,
      b. a grant means coupled to receive an output from said ask means,
   B. a highest priority level logic means associated with a second device having the highest priority and comprising:
      a. an ask means for receiving a request signal from said second device indicating that the second device desires to use the shared resource,
      b. a late request inhibit means coupled to receive an output from said ask means,
      c. a grant means coupled to receive an output from said last request inhibit means,
   C. a cycle initiate means coupled to receive an output from said lowest priority level grant means, and also coupled to receive an output from said highest priority level grant means to produce an initiate signal, wherein said initiate signal output by said cycle initiate means indicates that at least one of said devices is requesting use of said shared resource, D. a delay means for producing a delayed initiate signal by delaying said initiate signal a sufficient amount of time to allow ones of said grant means to be set that are going to be set during a priority resolution cycle, E. a lowest priority winner means coupled to receive said output from said lowest priority grant means and to receive said delayed initiate signal to produce a low win signal that indicates said first device has won use of said shared resource if no higher priority level grant means has been set once said delayed initiate signal is produced by asaid delay means, and F. highest priority winner means coupled to receive said output from said highest priority grant means and to receive said delayed initiate signal for producing a high win signal indicating that said second device has won use of said shared resource if said highest priority grant means is set when said delayed initiate signal appears, wherein said first device has the shortest path to said cycle initiate means and can initiate a priority resolution cycle quicker than said second device, and wherein said initiate signal is produced before a final winner of the shared resource is determined.

2. The apparatus of claim 1 wherein the low win signal output from said lowest priority winner means is coupled to an input of said lowest priority ask means to reset said ask means when it has been determined that said first device has won use of the shared resource, and wherein the high win signal output from said highest priority winner means is coupled to an input of said highest priority ask means to reset said ask means if said second device wins access to said shared resource.

3. The apparatus as in claim 2 further comprising a reset delay means coupled to receive said initiate signal output by said cycle initiate means, wherein said reset delay means produces a reset signal which is input to all of said grant means to reset all said grant means late in a priority resolution cycle and which returns to a state to enable all said grant means after the enabling of said late request inhibit means, thereby beginning a next priority resolution cycle.

4. The apparatus as in claim 1 further comprising one or more middle priority level logic means comprised of an ask means, a late request inhibit means, a grant means, and a middle priority winner means.

5. The apparatus as in claim 3 wherein an output of said ask means and an output of said grant means associated with said first device are combined by a request done means to produce a signal which indicates that a request of said first device to use the shared resource has been granted and said first device can make use of said shared resource.

6. The apparatus as in claim 5 wherein said ask means and said grant means are D-type flip-flops.

7. The apparatus as in claim 6 wherein said late request inhibit means is a NAND gate.

8. The apparatus as in claim 7 wherein said cycle initiate means is a NAND gate.

9. The apparatus as in claim 8 wherein said winner means is comprised of a said NAND gate and a NOR gate with the output of said NAND gate being an input into said NOR gate.

10. The apparatus as in claim 9 wherein said request done means is an OR gate.

11. A priority resolver for allocating a shared resource, said priority resolver comprising:

A. an ask flip-flop for each priority level that is set by a signal requesting use of said shared resource, wherein said individual ask flip-flops can be set at any time by any one of said priority requests signals and remain set until the associated priority level has won use of said shared resource, and wherein by resetting said ask flip-flop of said winning priority level relatively early within said priority resolution cycle, a subsequent request for said shared resource can be made and the same priority level can compete in the next of said priority resolution cycles, B. a grant flip-flop for each priority level, an output of said individual ask flip-flops is connected to inputs of a corresponding one of said grant flip-flops, said individual grant flip-flops are set during each priority resolution cycle if their corresponding ask flip-flop is set at the beginning of said priority resolution cycle, and wherein during each of said priority resolution cycle, as many grant flip-flops will be set as there are ask flip-flops set at the beginning of said priority resolution cycle, wherein all grant flip-flops are reset at the end of each of said priority resolution cycle by a common reset signal, and wherein at the beginning of said next priority resolution cycle is determined by said reset signal returning to a non-reset state, C. an initiate means for combining an output of each grant flip-flops to provide an early shared resource initiate signal that indicates that at least one priority level has requested use of said shared resource even though the final winner has yet to be determined, D. a first gate for receiving an output of each grant flip-flop to partially enable said first gate associated with the priority level, said first gate also coupled to receive an inverted output of all higher priority grant flip-flops, and wherein the individual outputs of said first gate indicate that the associated priority level might win use of said shared resource, E. a delay means for producing a delayed initiate signal by delaying said initiate signal a sufficient time to allow all said grant flip-flops that are going to set during said priority resolution cycle sufficient time to set, F. an individual second gate associated with each priority level that have as one input said output of their corresponding first gates and as an other input said delayed initiate signal, wherein during any given priority resolution cycle only one of said second gates is fully enabled and its output indicates that said associated priority level has really won access to said shared resource, said output of each said individual second gates is connected to reset its corresponding ask flip-flops so that once said real winner has been determined, its corresponding ask flip-flop will be reset while those ask flip-flops of all non-winning priority levels remain unchanged, G. a set gate between each ask flip-flop and its corresponding grant flip-flop of all but the lowest priority level, said set gate is partially enabled by said output of its ask flip-flop if its ask flip-flop has been set by said request signal, each said set gate further receives a common request cut-off signal which is initially in a state to partially enable all set gates, said request cut-off signal is derived from delaying said initiate signal sufficient time to allow all said grant flip-flops to set that have their corresponding ask flip-flops set at the beginning of said priority resolution cycle, each of said set gates also receives as inputs the inverted outputs of all lower priority level grant flip-flops such that the setting of any lower priority grant flip-flop will disable all said higher priority set gates and thereby prevent any late arriving requests from setting its corresponding grant flip-flop, said output of each ask flip-flop is enabled to set its corresponding grant flip-flop if said set gate is fully enabled, the output of said lowest priority level ask flip-flop is connected directly to set its ask flip-flop thus making the lowest priority logic path the shortest logic path to said cycle initiate means, said common reset signal is derived by delaying said initiate signal so that it returns to said non-reset state at the beginning of a next priority resolution cycle after said request cut-off signal assumes a request enable state and partially enables all set gates before said next priority resolution cycle begins.

12. The apparatus as in claim 11 wherein logic is provided to produce an early reset signal for resetting said grant flip-flop.

13. The apparatus of claim 12 wherein the output of said ask flip-flop and said grant flip-flop is ORed together to produce a signal indicating that the associated priority level request has been processed to the point where the associated priority level can make a subsequent request for said shared resource.

14. The apparatus as in claim 11 wherein said second gates are eliminated by providing said delayed initiate signal as an enabling signal to said first gates and wherein the output of said first gates is used as said reset signal to reset said ask flip-flops and to indicate that said associated priority level has really won access to said shared resource.

15. A method for resolving competing requests from devices for a shared resource on a priority basis during a priority resolution cycle comprising:
    A. setting an ask means associated with each of said devices when each of said devices requests use of said shared resource;
    B. setting a grant means associated with each of said devices if the ask means associated with a device is set early within a priority resolution cycle;
    C. producing an initiate signal if any grant means has been set;
    D. delaying said initiate signal to produce an inhibit signal used by an inhibit means associated with each of said devices except the lowest priority device to inhibit any late arriving requests from competing devices from setting its associated grant means;
    E. delaying said initiate signal to produce a delayed initiate signal which is input to a winner means associated with each of said devices, and said delayed initiate signal enables an output signal from said winner means if the grant means associated with the same device is set;
    F. resetting said ask means by use of the output signal from said winner means so that the ask means associated with the device which has won use of the shared resource is available to be set again to request use of the shared resource;
    G. delaying said initiate signal to produce a reset signal which is used to reset all grant means late within a priority resolution cycle, and wherein said reset signal returns to a non-reset state after said inhibit signal returns to a non-inhibit state, and wherein said output signal from said winner means is produced thereby if its associated grant means is set and no grant means associated with higher priority devices are set, wherein said inhibit means is disabled by the setting of any lower priority grant means, and wherein the competing device having the lowest priority level does not have an inhibit means between its ask means and its grant means thereby allowing the device having the lowest priority level to initiate a shared resource cycle in less time than any of the devices having higher priority levels.

* * * * *